May 28, 1935. W. G. BETZ 2,003,272
MASSAGING DEVICE
Filed Jan. 31, 1931 2 Sheets-Sheet 1
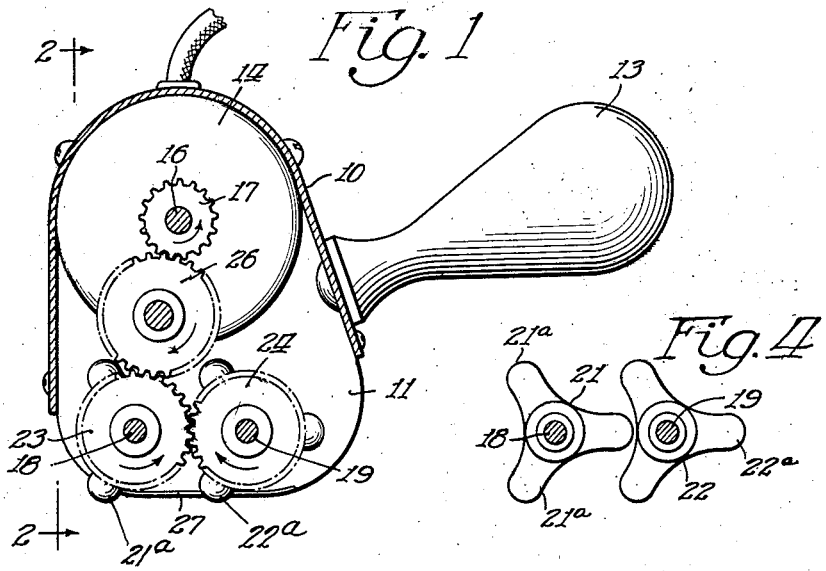
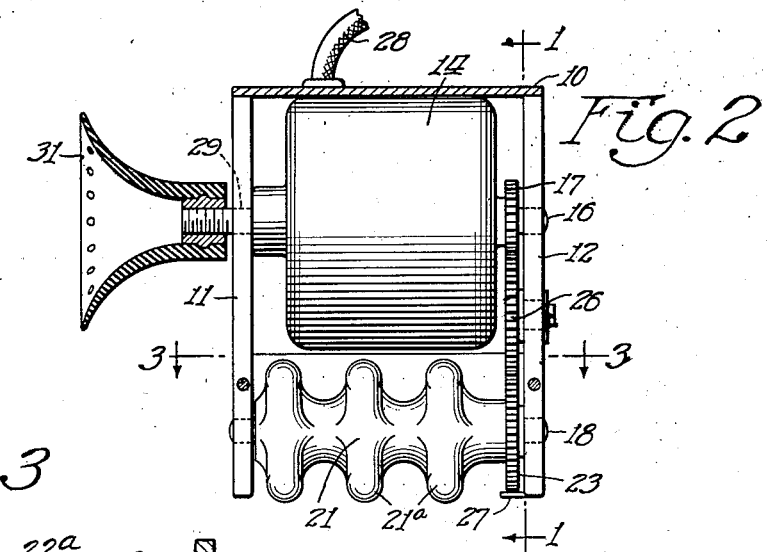
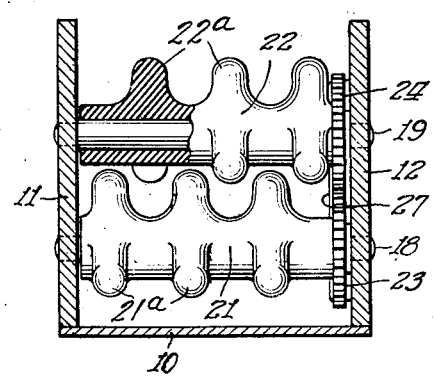
Inventor
William G. Betz

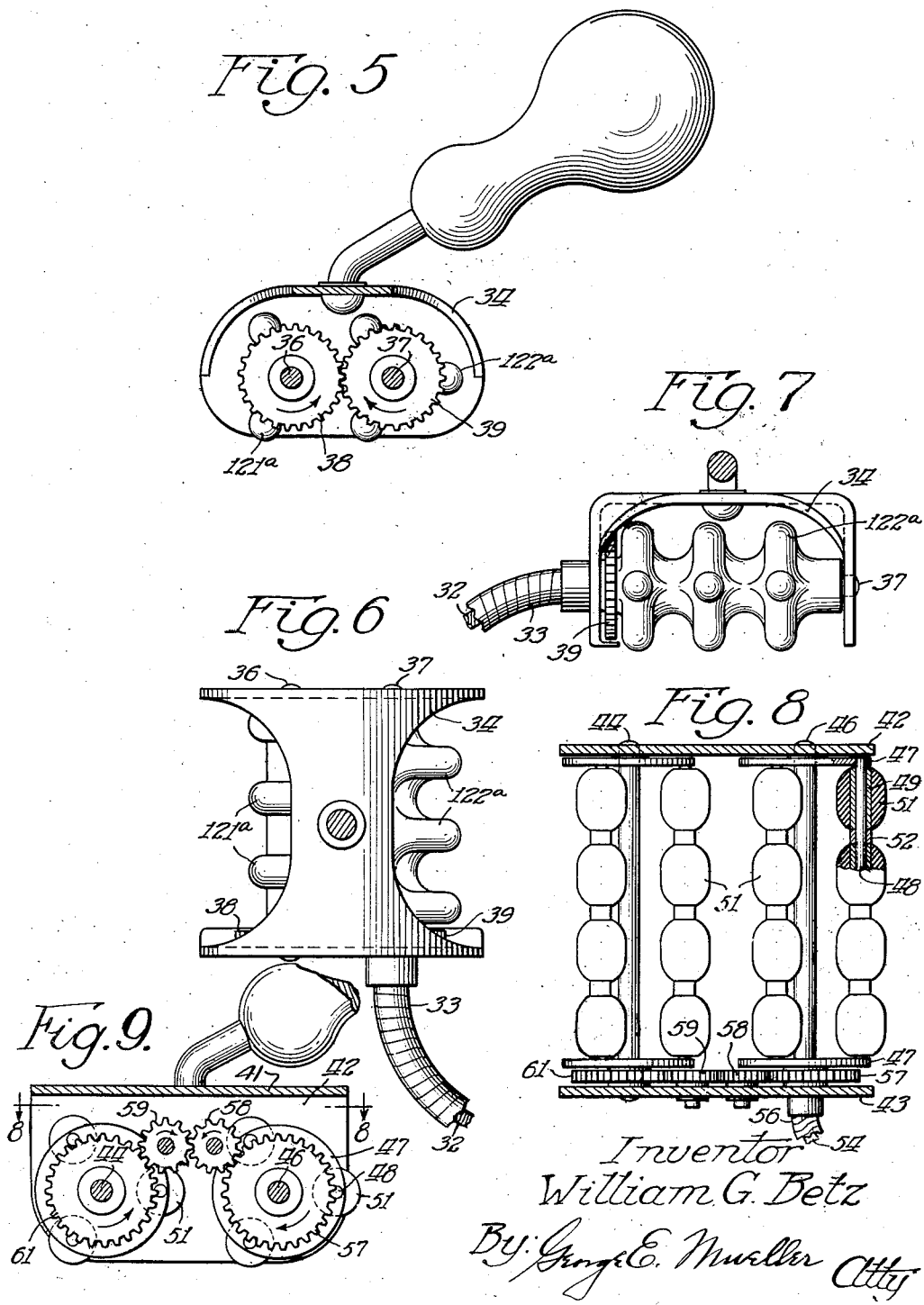

Patented May 28, 1935

2,003,272

UNITED STATES PATENT OFFICE 2,003,272

MASSAGING DEVICE

William G. Betz, Hammond, Ind.

Application January 31, 1931, Serial No. 512,612

3 Claims. (Cl. 128—59)

My invention relates in general to massaging and more in particular to an improved massaging device.

The principal object of the invention is the provision of a massaging device which will impart a massaging action to the body according to an improved method.

Another object is the provision of a massaging device which will closely imitate the movement of the human fingers.

Another object is the provision of a massaging device which is gentle but effective in its action.

Another object is the provision of a massaging device which will not merely treat the skin but the tissues below the skin as well.

Another object is the provision of a massaging device which may be employed on any part of the body, but which is particularly adapted for the treatment of sprains and strains in the deeper tissues.

Another object is the provision of a massaging device which is particularly adapted for the reduction of adipose of fat tissue, which may lie under the skin.

According to the general features of the invention, I provide two sets of co-acting finger-like members, which move relatively slowly toward each other and upwardly while in contact with the skin so as to impart to the skin and to the flesh and tissues beneath the skin a gentle lifting movement. The successive but cooperating action of the two sets of massaging members causes this lifting movement to be applied first from one side and then from the opposite side of the part being treated, thereby accomplishing a very natural and effective massaging movement. The device may be held in one position or may be moved slowly about a particular area of the body; but the action is such that the bodily movement of the device is not depended upon to impart any major portion of the massaging action, as is the case with most massaging implements heretofore used.

Other objects and features of the invention will be apparent from a consideration of the following detail description taken with the accompanying drawings, wherein, Fig. 1 is a side elevational view of the device, with one end cover removed, Fig. 2 is a sectional view thereof taken along the line 2—2 of Fig. 1, Fig. 3 is a plan sectional view taken along the line 3—3 of Fig. 2, Fig. 4 is a fragmentary sectional view through the massaging members showing the manner in which the members cooperate one with the other, Fig. 5 is a modified view showing the form which the device may take when operated from an outside source of power, Fig. 6 is a plan view of the form shown in Fig. 5, with the handle removed, Fig. 7 is a side view of the form shown in Fig. 5, with the handle removed, Fig. 8 is a plan sectional view showing still another modification, and Fig. 9 is an end view thereof, with the cover plate removed.

Referring first to Figs. 1 to 4, inclusive, this form of the device comprises a frame, including a top cover plate or housing 10, and side cover plates 11 and 12, a handle 13 being attached to the housing 10 for operation of the device. All of the operating mechanism is contained within the housing and includes a motor 14 of relatively slow speed type and having a shaft 16 to which is keyed a driving gear 17. I prefer the use of a type of motor having self-enclosed speed reducing mechanism so that the shaft 16 will travel at a slower speed than the motor speed. The driving gear 17 drives the moving massaging members, the construction and operation of which will now be described.

The massaging members include shafts 18 and 19, journaled in the cover plates 11 and 12, to which are secured by suitable means semi-soft rubber massaging members 21 and 22, these massaging members including massaging fingers 21a and 22a. The shaft 18 carries a gear 23, while a similar gear 24 meshing with gear 23 is carried by the shaft 19. An idler gear 26 meshing with the driving gear 17 also meshes with the gear 23, thereby driving the shaft 18 and with it the massaging member 21. The gear 24 meshing directly with the gear 23 drives the shaft 19 in the opposite direction. I design the shafts to turn in a direction to cause the massaging fingers at the place of engagement with the skin, to travel toward each other. As the direction arrows applied to Fig. 1 show, this result is secured with the gear system here employed.

As I construct and mount the massaging members, they act in cooperation with each other. In the preferred arrangement there are three sets of these fingers carried by each one of the members and the fingers of the two members are staggered with respect to each other so that the fingers of one massaging element may pass between the fingers of the other massaging element. The gears 23 and 24 are meshed, however, so that one set of fingers is approximately 60 degrees in advance of the other set and the two sets engage the skin alternately. As Fig. 4 shows, even though the fingers are not offset so as to pass each other, in actual fact they would pass each other, due to the timing arrangement employed. It is obvious, therefore, that I may either stagger the two sets of fingers, and maintain them in rotation phase; or I may use a uniform spacing of fingers on both massaging members so that the fingers are directly opposite each other on both members, and depend on the timing of rotation of the shafts to cause the fingers to pass each other in the manner pictured in Fig. 4. As another alternative I may stagger the massaging fingers on both shafts and also maintain the shafts approximately sixty degrees out of phase, and this is my preferred arrangement. With this form there is an alternate lifting of the skin from the two sides. When the massaging members are made to act together the skin may be engaged from opposite sides at the same time and an entire section of skin or tissue lifted by means of such engagement.

When employing the device it may be set directly onto the skin so that the side plates 11 and 12 contact with the skin, the fingers projecting below the side plates just enough to secure the proper action but not enough to cause too great a digging into the skin, which might be objectionable in certain cases. It is obvious, however, that I may proportion the side plates with respect to the fingers so as to have any desirable portion of the fingers projecting below the side plates. In order to avoid any possibility of the gears 23 and 24 coming in contact with the skin, I provide a plate extension 27 secured to the bottom of the side plate 12. This member 27 may be made integral with the side plate or may be secured on as a separate piece, depending upon the specific structural details found most desirable.

The motor 14 is of any suitable type as described and a flexible electrical conductor 28 connects therewith through the housing 10 in the manner shown. I also extend the motor shaft 29 through the side plate 11 and connect thereto an ordinary type of massaging device 31 shown in the form of a hollow rubber cup. This is a familiar form of massaging instrument, which may be found of advantage under certain circumstances, particularly where the treatment may require a massaging action which is confined more to the outer or skin areas than to the deep tissues. Since the device 31 preferably travels at a higher rate of speed, I take it directly from the motor shaft 29, which travels at the same speed as the motor.

In the form of the device shown in Figs. 5 to 7 inclusive, the source of power is outside the massaging instrument itself and motion is conveyed to the massaging instrument by means of a flexible shaft 32, supported in a flexible housing 33. The flexible shaft and housing are connected to a motor maintained (not shown) at any suitable and convenient stationary position.

As to the details of construction of this modified form, it is substantially the same in principle as that described in connection with the main form. A housing 34 has journaled therein shafts 36 and 37 connected by gears 38 and 39, which are keyed or otherwise secured to the shafts. The flexible shaft 32 is connected directly to drive the shaft 37 and by means of the gear arrangement the two shafts are turned in opposite direction as in the main form.

As to the massaging fingers, these may be in all respects the same as shown in the main form, and I apply the same reference characters thereto as used in the main form with the exception that in the modifications, each one of the modifications is prefixed by the numeral 1.

Figs. 8 and 9 show a modification in which the massaging fingers are somewhat differently constructed and have a slight rolling action over the skin, thereby imparting a somewhat different specific effect than is secured in the other forms, where the semi-soft rubber fingers have a tendency to grip the skin by friction.

In this form a housing is provided, comprising a top plate 41 and side plates 42 and 43. Between the side plates are journaled shafts 44 and 46, which carry the massaging fingers.

Since the construction of the massaging or skin engaging fingers is uniform throughout, I shall describe the manner of mounting them as if only a single mechanism were employed. At each end of the shafts, discs or plates 47 are secured and these discs are subtended by rods 48 to which the massaging fingers are attached. These fingers comprise sleeves 49, which are journaled on the rods 48 on the outside of which sleeves are secured semi-soft rubber, skin engaging members 51. In the present embodiment there are four of such fingers on each one of the rods 48 and spacers 52 disposed on the rods, separate and space them. It will be understood that each one of the finger assemblies operates as a unit and when the shaft is turned the whole assembly turns, carrying the skin engaging members 51 in a rotary movement about the axis of the shafts 44 and 46. These assemblies are adjusted so that the fingers pass each other alternately. In other words, with three sets of fingers in connection with each assembly as shown, one shaft will be timed approximately sixty degrees in advance of the other to secure the best mechanical results. I may use a different timing, however, all that is necessary being that the two finger assemblies pass each other without interference.

As to driving the finger assemblies in this modified form, I may employ an outside motor or a built-in motor as shown in either one of the two prior forms. For simplicity and convenience, I show a drive by means of a flexible shaft 54 direct connected to the shaft 46 and protected by a flexible housing 56. The shaft 46 carries a gear 57, which by means of two idler gears 58 and 59 transmits its movement to a gear 61 carried by the shaft 44. By employing the two idlers 58 and 59 I am able to drive the two finger assemblies in opposite direction, the same as if the two gears 57 and 61 were direct connected.

The form of device shown in Figs. 8 and 9 is operated substantially the same as the other forms, but as previously suggested a somewhat different result is obtained. The massaging members 51 have a rolling action over the skin and this is very desirable under certain conditions. The action of the fingers as a whole, however, is such as to impart a beneficial stimulation to the deeper tissues below the skin, lifting the tissues inwardly and upwardly and loosening the subcutaneous body structure in a most desirable way. Since the device moves at a relatively slow rate of speed as compared with the ordinary type of massaging device, a gentle movement back and forth from one side to the other takes place a good deal the same as where a hand massage is administered. However, due to the action which is obtainable by means of the massaging fingers the skin and flesh are handled according to a specifically different method than is customary or possible by hand manipulation.

Although I describe the details of my invention to make the same understandable to those skilled in the art, it is obvious that I do not restrict myself to the particular forms shown and described. The invention is limited only by the scope of the appended claims.

What I claim as new and desire to protect by Letters Patent of the United States is:—

1. In a massaging device, a frame including a pair of end plates, a pair of rotatable shafts journalled in said plates, a massaging element carried by each of said shafts comprising discs encircling each shaft disposed between said end plates and adjacent thereto, rods lying parallel to the shaft and secured to said discs, independently revolving massaging rollers carried by said rods, and means for turning said shafts in opposite directions to rotate said massaging elements whereby the massaging rollers revolve when in contact with the skin to produce a kneading-massaging action on the skin.

2. In a hand operated portable massaging device, a frame, a pair of parallel massaging rollers oppositely positioned and substantially adjacent in the frame, each roller comprising a pair of end plates carried on a shaft journalled in the frame, a plurality of rods carried by the end plates lying parallel to said shaft and spaced around and away therefrom, independently rotatable massaging fingers carried on each rod, and means for rotating said rollers in opposite directions to provide a kneading-massaging action on a small area of skin treated.

3. In a portable hand operated massaging device, a frame, a pair of parallel massaging rollers rotatably carried in the frame and spaced apart a distance whereby upon rotation thereof the outermost points of said elements will describe relatively fixed circles with the peripheries of the rollers slightly separated from one another, each of the rollers having a massaging surface comprising a plurality of independently rotatable massaging elements, means for rotating said rollers in opposite directions, and a handle for said device whereby it may be applied to and moved over the body to massage selected areas thereof.

WILLIAM G. BETZ.